(12) United States Patent
Matsumori et al.

(10) Patent No.: US 10,589,401 B2
(45) Date of Patent: Mar. 17, 2020

(54) SINTERED VITRIFIED SUPERFINISHING GRINDSTONE

(71) Applicant: MIZUHO CO., LTD., Osaka (JP)

(72) Inventors: Noboru Matsumori, Kyoto (JP); Toshiyuki Nabemoto, Kyoto (JP); Toshio Nakazawa, Kyoto (JP)

(73) Assignee: MIZUHO CO., LTD., Osaka (JP)

( * ) Notice: Subject to any disclaimer, the term of this patent is extended or adjusted under 35 U.S.C. 154(b) by 228 days.

(21) Appl. No.: 15/559,716

(22) PCT Filed: Aug. 5, 2015

(86) PCT No.: PCT/JP2015/072213
§ 371 (c)(1),
(2) Date: Sep. 19, 2017

(87) PCT Pub. No.: WO2016/157560
PCT Pub. Date: Oct. 6, 2016

(65) Prior Publication Data
US 2018/0257199 A1    Sep. 13, 2018

(30) Foreign Application Priority Data
Apr. 2, 2015   (JP) ................ 2015-075918

(51) Int. Cl.
*C09K 3/14* (2006.01)
*B24D 3/18* (2006.01)
(Continued)

(52) U.S. Cl.
CPC ............ *B24D 3/18* (2013.01); *B24D 3/06* (2013.01); *C09G 1/02* (2013.01); *C09K 3/1418* (2013.01);
(Continued)

(58) Field of Classification Search
CPC combination set(s) only.
See application file for complete search history.

(56) References Cited

U.S. PATENT DOCUMENTS

| 2010/0037531 A1 | 2/2010 | Huzinec et al. |
| 2015/0059256 A1* | 3/2015 | Mejean .................... B24D 3/06 51/309 |

FOREIGN PATENT DOCUMENTS

| JP | 2-53565 | 2/1990 |
| JP | 5-253848 | 10/1993 |

(Continued)

OTHER PUBLICATIONS

International Search Report dated Oct. 20, 2015 in International (PCT) Application No. PCT/JP2015/072213.
(Continued)

*Primary Examiner* — James E McDonough
(74) *Attorney, Agent, or Firm* — Wenderoth, Lind & Ponack, L.L.P.

(57) ABSTRACT

A sintered vitrified superfinishing grindstone is provided which is a sintered product which is obtained by compression molding of a mixed powder of: a sinterable vitrified binder composed of a powder of a borosilicate glass composition; hard abrasive grains; and soft abrasive grains; and which includes bonded portions formed by necking due to heat compression, between particles of the powder of the borosilicate glass composition which are in contact with each other; and wherein the sinterable vitrified binder contains from 94 to 100% by mass of a powder composed of a low-melting-point borosilicate glass composition containing from 35 to 55% by mole of $SiO_2$; from 3 to 5% by mole of $Al_2O_3$; from 10 to 35% by mole of $B_2O_3$; and from 25 to 30% by mole of $R_2O+RO$.

15 Claims, 11 Drawing Sheets

(51) Int. Cl.
*B24D 3/06* (2006.01)
*C09G 1/02* (2006.01)
*B24D 3/00* (2006.01)
*B24D 3/02* (2006.01)
*B24D 11/00* (2006.01)
*B24D 18/00* (2006.01)

(52) U.S. Cl.
CPC ........ *B24D 18/0009* (2013.01); *C09K 3/1454* (2013.01)

(56) References Cited

FOREIGN PATENT DOCUMENTS

| | | |
|---|---|---|
| JP | 9-267266 | 10/1997 |
| JP | 2000-343438 | 12/2000 |
| JP | 2001-300856 | 10/2001 |
| JP | 2002-370172 | 12/2002 |
| JP | 2006-130635 | 5/2006 |
| JP | 2006130635 A * | 5/2006 |
| JP | 2010-521323 | 6/2010 |
| JP | 2014-61554 | 4/2014 |
| JP | 2015-506851 | 3/2015 |
| WO | 2013/102174 | 7/2013 |

OTHER PUBLICATIONS

International Preliminary Report on Patentability dated Oct. 3, 2017 in International (PCT) Application No. PCT/JP2015/072213.

\* cited by examiner

Evaluated length = 0.400 mm
Measured speed = 0.03 mm/s
Cutoff value = 0.08 mm
Filter type = Gaussian
Measurement range = ± 40.0 μm
Tilt correction = R surface
Cutoff ratio = none Ra = 0.016 μm
Ry = 0.134 μm
Rz = 0.103 μm
Rt = 0.163 μm ⟨ Roughness curve ⟩
Longitudinal magnification = 50000
Lateral magnification = 500
Longitudinal scale = 0.2 μm/10 mm
Lateral scale = 20 μm/10 mm ⟨ Roughness curve ⟩

Longitudinal magnification = 50000
Lateral magnification = 500
Longitudinal scale = 0.2 μm/10 mm
Lateral scale = 20 μm/10 mm Evaluated length = 0.400 mm
Measured speed = 0.03 mm/s
Cutoff value = 0.08 mm
Filter type = Gaussian
Measurement range = ± 40.0 μm
Tilt correction = R surface
Cutoff ratio = none Ra = 0.015 μm
Ry = 0.124 μm
Rz = 0.103 μm
Rt = 0.171 μm m   m m

SINTERED VITRIFIED SUPERFINISHING GRINDSTONE

TECHNICAL FIELD

The present invention relates to a sintered vitrified superfinishing grindstone in which abrasive grains are held by a sintered vitrified bond and which is used in superfinishing.

BACKGROUND ART

In general, vitrified grindstones are used in working operations involving high speed grinding, under various grinding conditions. In cases where grinding is carried out at a relatively high temperature, a water-soluble oil having a good cooling performance is used.

On the other hand, in superfinishing or honing in which a grindstone and a product to be processed are brought into surface contact at a low speed, a water-insoluble oil having a high lubricity and permeability or washability is used, in order to prevent clogging of the grindstone and to facilitate the discharge of cutting chips produced.

A water-soluble oil is used not only for preventing the occurrence of a fire, but also for various reasons regarding productivity and economic efficiency, for example, for intensively collecting the cutting chips produced in chip-generating processes; reducing the area required for installing machines; improving environment, and enabling unmanned operation.

However, in cases where superfinishing is carried out using a water-soluble oil and a vitrified grindstone including fine alumina abrasive grains, it has been empirically recognized that the grindstone is prone to intense clogging shortly after the start of the superfinishing.

In order to appropriately perform superfinishing with a vitrified superfinishing grindstone under the use of a water-soluble oil, it is considered to be a valid countermeasure to use a vitrified grindstone including composite abrasive grains of hard alumina abrasive grains and soft abrasive grains.

Characteristics required for a vitrified bond which holds abrasive grains, such as composite abrasive grains, are: a capability to form a porous grindstone structure, so that the resulting grindstone can exhibit its intrinsic high performance regardless of the type of cooling oil used; and a capability to allow the resulting grindstone to perform grinding with a low abrasion loss, and to provide a finished surface with a sufficiently low surface roughness.

In general, a superfinishing grindstone is produced as follows: abrasive grains, a vitrified bond, and a pore-forming material or a molding auxiliary such as resin balls are mixed, so that the vitrified bond holding the abrasive grains will have a porous structure; the resultant is molded by slip casting or press molding to form a raw grindstone, followed by drying; and then, in a subsequent calcination step, the resultant is heated to a temperature at which the vitrified bond melts and maintained at that temperature for several hours, followed by a finishing step, thereby obtaining the superfinishing grindstone as a product (see the below-identified Patent Document 1).

In the vitrified grindstone produced by the above described production process in which the bond goes through a molten state, pores 4 are formed (see FIG. 2) due to the disappearance of the pore-forming material, such as resin, when glassy bond particles are calcined under normal pressure at a temperature equal to or higher than its melting point. At the same time, the glassy bond particles melt to form bond belts (bond bridges) 5 between the abrasive grains. Thereafter, the bond belts 5 change from liquid to solid in a subsequent cooling process, and the resultant shrinks to reduce the number of pores therein, to finally give a grindstone having a high degree of coupling and a high strength.

Further, a technique is known in which a part of a vitrified binder in an amount of about from 10 to 30% by volume is allowed to melt by a complete melt-solidifying agent, and thereby allowing the binder to hold the abrasive grains with an appropriate hardness, and at the same time, a part of the vitrified binder is sintered so that the sintered portion of the binder moderately degrades during the cutting, to allow for expanding flow paths through which cutting chips are discharged, and for stably securing the flow paths (see the below-identified Patent Document 2).

Still further, a vitrified grindstone is known, which is obtained by subjecting a molded grindstone including a borosilicate glass powder as a vitrified binder, abrasive grains, and carbonaceous spherical particles, to pressure sintering by an electrical heating method at a temperature of a 700° C. or lower, and in which the abrasive grains are held by the resulting sintered product having a porosity of 5% by volume or less (see the below-identified Patent Document 3).

In addition, a low-melting-point inorganic glass is known, which contains from 40 to 48% by mole of $SiO_2$, from 4.5 to 5.5% by mole of $Al_2O_3$, from 25 to 32% by mole of $B_2O_3$, and from 20 to 27% by mole of $R_2O+RO$, so that the inorganic glass as a vitrified binder melts at a temperature of from 650 to 750° C. during the calcination step in the production of a vitrified superfinishing grindstone including composite abrasive grains (see the below-identified Patent Document 4).

PRIOR ART DOCUMENTS

Patent Documents

Patent Document 1: JP 2014-61554 A (paragraph 0026 to 0028, etc.)
Patent Document 2: JP 5-253848 A
Patent Document 3: JP 2000-343438 A
Patent Document 4: JP 2006-130635 A (Table 1 in paragraph 0045)

PROBLEMS TO BE SOLVED BY THE INVENTION

In the vitrified superfinishing grindstone disclosed in Patent Document 2, a sintered state for holding the abrasive grains is obtained by including from 10 to 30% by volume of a binder which solidifies after completely melting. In this arrangement, however, the melt-solidified portions of the bond cause a decrease in the porosity of the grindstone, and the efficiency to discharge cutting chips is reduced correspondingly to the decreased porosity. As a result, it becomes unable to reduce the roughness of the finished surface to a desired degree, and the grindstones described in Examples in Patent Document 2 exhibited a surface roughness Ra, as measured by a superfinishing test, of merely about 0.06 μm.

In the sintered product including the vitrified bond disclosed in Patent Document 3, a resistive sintering apparatus or the like is used to adjust the sintering temperature to 700° C. or lower, so that the abrasive grains are held together with carbon particles. However, the porosity of the sintered product is limited to 5% by volume or less (paragraph 0043), in order to impart as much strength as possible to the grindstone to reduce its abrasion loss. In this case, addition of carbonaceous spherical particles is required, in order to expand and to secure the flow paths for discharging cutting chips, which become insufficient as a result of the low porosity.

However, when a large amount of carbonaceous particles is added in order to reduce the roughness of the surface finished by superfinishing to a minimum possible degree, and to further enhance the function of discharging cutting chips, there arises a problem that the strength of the sintered product is reduced as the added amount of carbonaceous particles is increased.

Further, in the low-melting-point inorganic glass disclosed in Patent Document 4, the abrasive grains are embedded in and held by the glass which has been melted once then solidified.

The strength of such a low-melting-point inorganic glass to hold the abrasive grains is provided by a dense solid phase which is formed as a result of being solidified after melting. However, since the melt-solidified glass and the abrasive grains held by the glass have large contact areas therebetween, the glass is susceptible to distortion due to the difference in thermal expansion coefficient between the glass and the abrasive grains. Therefore, the addition of an inorganic mineral having a high melting point has been performed, in order to decrease the difference in thermal expansion coefficient, to obtain a required strength for holding the abrasive grains.

As described above, in a conventional vitrified-bond superfinishing grindstone produced by allowing the vitrified bond to solidify after melting, the strength of the bond to hold abrasive grains is unstable due to thermal expansion; whereas one produced by sintering does not have a porosity sufficient to reduce the abrasion loss of grindstone. Accordingly, it has not been easy to increase the finishing ratio of the grindstone, and to provide a function of smoothly discharging cutting chips, at the same time.

SUMMARY OF THE INVENTION

Therefore, an object of the present invention is to solve the above described problems associated with the vitrified superfinishing grindstones, and to provide a sintered vitrified superfinishing grindstone for carrying out a highly accurate superfinishing: in which abrasive grains are securely held by a sintered vitrified bond having a porous structure; which is capable of retaining an appropriate porosity and a sufficient hardness and strength, in order to expand and to stably secure the flow paths for discharging cutting chips; and which is capable of achieving a high finishing ratio and a sufficiently low finished surface roughness.

Further, it is also an object to the present invention to solve the problems associated with the vitrified superfinishing grindstones, particularly, in the case of being used under the following conditions.

When performing superfinishing, there are cases where a water-insoluble oil is used which is, for example, obtained by mixing a light mineral oil as a main component, with a sulfurized fatty oil or sulfur-chlorinated fatty oil or the like, and which has an excellent permeability, slight oiliness, and melt-adhesion resistance. A water-insoluble oil usually does not contain a surfactant, since a suitable permeability and lubricity can be obtained by adequately selecting a mineral oil to be used as a main component.

On the other hand, a water-soluble oil has a high solubility in water, and contains a surfactant in order to improve the properties such as permeability and lubricity. A part of the surfactant contained in the water-soluble oil, in which oily components are emulsified, turns into an adhesive component insoluble in water, and adheres to the surface of the grindstone, thereby causing a problem of intense clogging.

Therefore, it has also been an object of the present invention to provide a sintered vitrified grindstone capable of achieving a high cutting amount with a very low abrasion loss of grindstone, without causing clogging of the working surface of the grindstone, when the sintered vitrified grindstone is used in superfinishing using a water-soluble oil, which is advantageous in terms of safety and economic efficiency.

Means for Solving the Problems

In order to solve the above mentioned problems, the present invention provides:
a sintered vitrified superfinishing grindstone,
wherein the sintered vitrified superfinishing grindstone is a sintered product which is obtained by compression molding of a mixed powder of: a vitrified binder composed of a powder of a borosilicate glass composition; and abrasive grains; and which includes bonded portions formed by necking due to heating, between particles of the powder of the borosilicate glass composition which are in contact with each other; and
wherein the vitrified binder is a sinterable vitrified binder which contains from 94 to 100% by mass of a powder composed of a low-melting-point borosilicate glass composition containing from 35 to 55% by mole of $SiO_2$; from 3 to 5% by mole of $Al_2O_3$; from 10 to 35% by mole of $B_2O_3$; and from 25 to 30% by mole of $R_2O+RO$.

The sintered vitrified superfinishing grindstone of the present invention having the above described constitution is obtained by compression molding of a mixed powder of: a sinterable vitrified binder containing a specified low-melting-point borosilicate glass composition in a specified amount; and abrasive grains. By subjecting the above described mixed powder to compression molding, particles of the powder of the borosilicate glass composition are partially bound with each other to form interparticle bonds, due to heating, to provide a sintered product including constricted bonded portions formed by necking.

The specified low-melting-point borosilicate glass composition used in the above described grindstone is one containing a small amount of alumina ($Al_2O_3$) having a melting point exceeding 2,000° C., and a large amount of boric acid ($B_2O_3$) and an alkaline component ($R_2O$) having a low melting point. Therefore, it is possible to obtain a sintered product having a high strength to hold abrasive grains, by heating at a low temperature.

The powder of the low-melting-point borosilicate glass composition as described above can be formed into a grindstone having a high hardness and a required bending strength, by being subjected to sintering. Thus, the resulting sintered vitrified-bond superfinishing grindstone has a low wear rate when used in superfinishing, exhibits an improved finishing ratio and an excellent strength, and allows for superfinishing without the occurrence of clogging.

Further, in the present invention, it is preferred that the mixed powder of the abrasive grains and the bond be subjected to a compression molding in order to impart a three-dimensional porous structure to the resulting sintered product, and sintered so as to include bonded portions formed by necking due to heating, between particles of the powder of the borosilicate glass composition which are in contact with each other. At this time, the compression molding is preferably a hot compression molding (hot press).

In the sintered vitrified grindstone according to the present invention, the glassy bond is heated at a temperature equal to or lower than the melting point of the bond, and compression molded at the same time, to cause bindings between the particles, referred to as necking. Thus, a large number of constricted bonded portions are formed between the particles of the constituent bond, in other words, the particles of the powder of the borosilicate glass composition are partially bound with the surrounding particles due to heating, to form a porous sintered product having a three-dimensional net-like structure with a high strength. In this manner, it is possible to obtain a grindstone having a degree of coupling and a strength required for performing superfinishing.

There is no particular limitation on the abrasive grains to be integrally held by a sintered product formed using a low-melting-point borosilicate glass composition having a specified composition, as described above, and various types of abrasive grains can be selected. However, in order to improve the function to prevent clogging, it is preferred to use composite abrasive grains obtained by mixing: one or more kinds of hard abrasive grains selected from white alumina matter, green silicon carbide matter, cubic boron nitride and diamond; and one or more kinds of soft abrasive grains selected from cerium oxide, barium sulfate, silicon oxide, zirconium oxide and calcium carbonate.

When a specified kind(s) of hard abrasive grains and a specified kind(s) of soft abrasive grains are used selectively, as described above, it is possible to obtain a grindstone having a high degree of coupling and a high strength, for example, by sintering the mixture of the vitrified bond and composite abrasive grains of: soft abrasive grains (barium sulfate, $BaSO_4$, or cerium oxide, $CeO_2$) which do not have a cutting ability; and hard abrasive grains (alumina abrasive grains A, WA, or silicon carbide abrasive grains C, GC) or super-hard abrasive grains (CBN, SD); to allow the abrasive grains to be held by the vitrified bond.

The sintered vitrified superfinishing grindstone obtained using the sintered vitrified bond, in the manner as described above, can be used in superfinishing without causing clogging, even in the case of using a water-soluble oil, in particular, and is capable of achieving a high cutting amount with a very low abrasion loss of grindstone.

In the grindstone including composite abrasive grains, soft abrasive grains without cutting ability are dispersed around white alumina (WA) abrasive grains to form a lubricant surface layer, and serve to alleviate microdamage generated on the grindstone surface, by the abrasive grains with cutting ability, thereby preventing the adhesion and intrusion of cutting chips, and the occurrence of a melt-adhesion phenomenon. This also brings about a favorable result in the case of using a water-soluble oil.

In such a superfinishing grindstone, the breakage and the like of the glassy component of the sinterable vitrified bond can occur during the use, due to the presence of micropores which are formed by sintering and are inherent to the grindstone, and the bond erosion caused by cutting chips produced at the working surface of the grindstone. As a result, the grindstone will have a three-dimensional porous structure in which a plurality of pores are connected. In other words, the working surface of the grindstone will have a micro-fractal structure with irregularities, and the resulting vitrified grindstone has water repellency or oil repellency.

In addition, the sintered vitrified superfinishing grindstone preferably has an RH hardness of 100 or more, and a bending strength of 50 MPa or more, in order to achieve a high cutting amount with a very low abrasion loss of grindstone.

An RH hardness of 100 or more allows for providing an excellent grindstone capable of achieving an extremely high finishing ratio (cutting amount/abrasion loss of grindstone). In this case, the grindstone needs to have a bending strength of 50 MPa or more, so as not to be fragile.

In order to reliably obtain such a cutting performance, it is preferred that the sintered vitrified superfinishing grindstone according to the present invention have the above described required hardness and strength, and a porosity adjusted to a range of from 8 to 20% by volume. The reason for this is as follows. Although a porosity of less than 8% by volume is preferred in terms of obtaining a grindstone having a high hardness, it causes the expansion and stable securement of the flow paths for discharging cutting chips to be insufficient, and thus is not preferred from this viewpoint. At the same time, a porosity of more than 20% by volume is not preferred, because it makes it difficult to sufficiently enhance the strength of the resulting grindstone, so as to achieve a high cutting amount with a reduced abrasion loss of grindstone.

The thus obtained sintered vitrified superfinishing grindstone according to the present invention has a high hardness and a low pore volume. Accordingly, the grindstone has a dense cross section, and has a low pore volume of about from 8 to 20% by volume, and thus, the suction of a working fluid due to capillary phenomenon, and adhesion will be increased.

As a result, the clogging and the melt-adhesion of cutting chips become less likely to occur. As can be clearly seen from the results of an actual cutting test to be described later, although the working surfaces of the grindstones used in the test are equally dark and stained blackish, the melt-adhesion of the cutting chips is not observed, even on the working surfaces of untreated grindstones.

Further, the sintered product is preferably a sintered product obtained by resistive sintering, or a sintered product obtained by induction heating, so that the above described sintering treatment step can be carried out efficiently, and uniformly even to the interior of the sintered product, to obtain the above described required characteristics.

More specifically, the hot compression is preferably carried out using graphite, which is a conductor of electricity, as a mold material, and by: a sintering method using a resistive sintering furnace, which is composed of a resistive heating furnace for increasing and maintaining the temperature of the mold, integrally provided with a pressurizing mechanism; or by a high-frequency heating method. This is preferred in order to produce a sintered vitrified superfinishing grindstone which is formed using a sinterable vitrified binder containing a specified low-melting-point borosilicate glass composition in a specified amount, which has an RH hardness of 100 or more and a bending strength of 50 MPa or more, and which has a porosity adjusted to a specified level.

Effect of the Invention

Since the sintered vitrified superfinishing grindstone according to the present invention is a sintered product which is obtained by compression molding of a mixed powder of a specified sinterable vitrified binder and abrasive grains, and in which the particles of the powder of the borosilicate glass composition are partially bound with each other to form interparticle bonds, due to heating, the abrasive grains are securely held by the sintered vitrified bond having a porous structure. At the same time, there are advantages that the resulting grindstone has an appropriate porosity and a sufficient hardness and strength for expanding and stably securing the flow paths for discharging cutting chips, and that the grindstone allows for a highly accurate superfinishing, enabling to achieve a high finishing ratio and a sufficiently low finished surface roughness.

Further, there are also advantages that the sintered vitrified grindstone is capable of achieving a high cutting amount with a very low abrasion loss of grindstone, without causing clogging of the working surface of the grindstone, even in the case of performing superfinishing using a water-soluble oil.

BRIEF DESCRIPTION OF THE DRAWINGS

FIG. 5 (b) shows the measurement conditions for the surface roughness test.

FIG. 6 (b) shows the measurement conditions for the surface roughness test.

FIGS. 7(a)-7(b) are scanning electron microscope photographs showing the sintered structure of the surface of the sintered vitrified superfinishing grindstone of Example 1: FIG. 7 (b) is a macrophotograph taken at a magnification of 1,000-fold.

FIGS. 8(a)-8(b) are scanning electron microscope photographs showing the sintered structure of the surface of the sintered vitrified superfinishing grindstone of the conventional example: FIG. 8 (b) is a macrophotograph taken at a magnification of 1,000-fold.

FIG. 9 (b) is a drawing substitute photograph showing the working surface of a grindstone of Example 2 after the actual cutting test using a water-soluble oil.

FIG. 10 (b) is a drawing substitute photograph showing the working surface of a grindstone of Example 4 after the actual cutting test using a water-insoluble oil.

FIG. 11 (b) is a drawing substitute photograph showing the working surface of a grindstone of Comparative Example 3 after the actual cutting test using a water-soluble oil.

FIG. 12 (b) is a drawing substitute photograph showing the working surface of the grindstone of Comparative Example 3 after the actual cutting test using a water-insoluble oil.

FIG. 13 (b) is a drawing substitute photograph showing the working surface of a grindstone of Comparative Example 6-(2) after the actual cutting test using a water-soluble oil.

FIG. 14 (b) is a drawing substitute photograph showing the working surface of the grindstone of Comparative Example 6-(2) after the actual cutting test using a water-insoluble oil.

FIG. 15 (b) is a drawing substitute photograph showing the working surface of a grindstone of Comparative Example 5 after the actual cutting test using a water-soluble oil.

FIG. 16 (b) is a drawing substitute photograph showing the working surface of the grindstone of Comparative Example 5 after the actual cutting test using a water-insoluble oil.

FIG. 17 (a) is a drawing substitute photograph showing the working surface of a grindstone of Example 5 after the actual cutting test using a water-soluble oil; FIG. 17 (b) is a drawing substitute photograph showing the working surface of a grindstone of Example 6 after the actual cutting test using a water-insoluble oil; and FIG. 17 (c) is a drawing substitute photograph showing the working surface of the grindstone of Example 6 (without wax treatment) after the actual cutting test using a water-insoluble oil.

FIG. 18 (b) is a drawing substitute photograph showing the working surface of the grindstone of Comparative Example 8 after the actual cutting test using a water-insoluble oil.

FIG. 19 (b) is a drawing substitute photograph showing the working surface of the grindstone of Comparative Example 9 after the actual cutting test using a water-insoluble oil.

MODE FOR CARRYING OUT THE INVENTION

Figure 1:
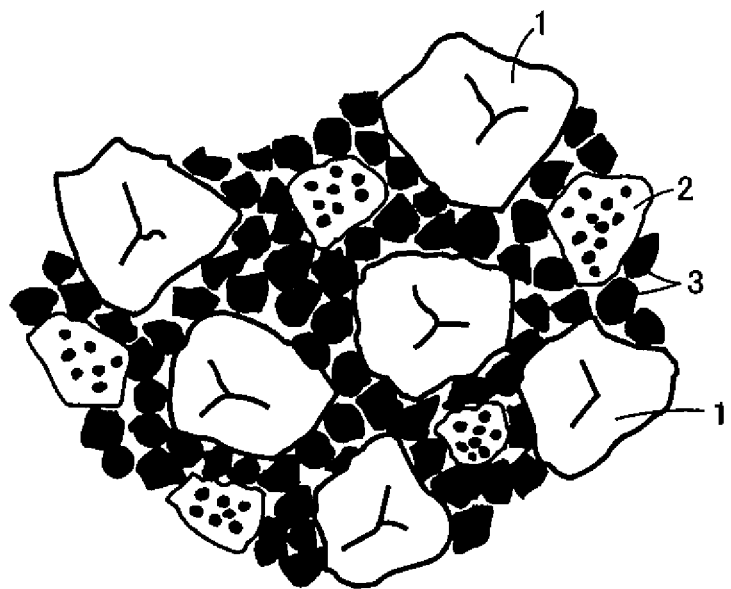
FIG. 1 is a schematic explanatory diagram showing the structure of a superfinishing grindstone embodying the present invention.
Figure 2:
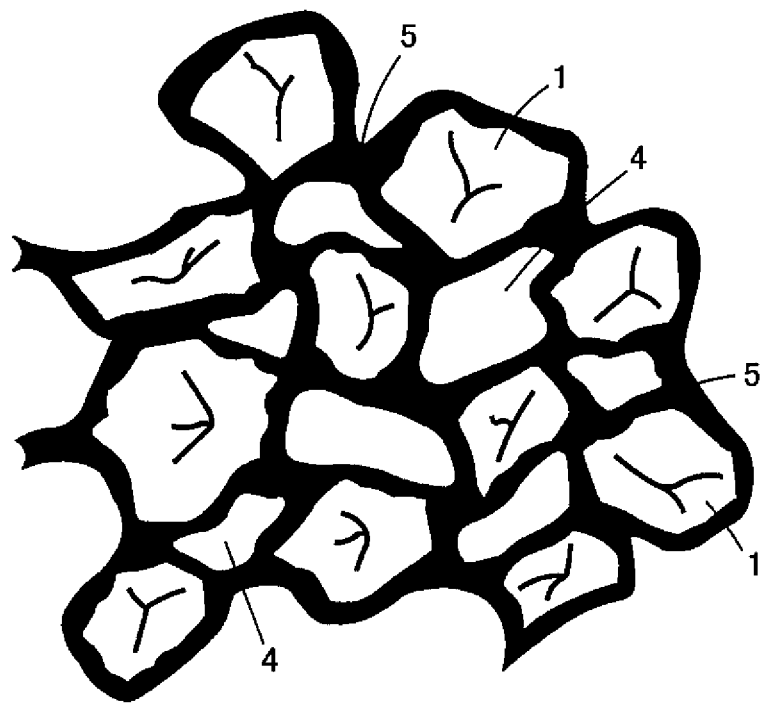
FIG. 2 is a schematic explanatory diagram showing the structure of a superfinishing grindstone of a conventional example.

A sintered vitrified superfinishing grindstone embodying the present invention has a structure as shown in FIG. 1, and is obtained by compression molding of a mixed powder composed, for example, of: hard abrasive grains 1 and soft abrasive grains 2, and a sinterable vitrified binder (particles) 3 which preferably contains from 94 to 100% by mass of a fine powder having a particle diameter of less than 20 μm. The sinterable vitrified binder (particles) 3 is composed of a low-melting-point borosilicate glass composition containing from 35 to 55% by mole of $SiO_2$; from 3 to 5% by mole of $Al_2O_3$; from 10 to 35% by mole of $B_2O_3$; and from 25 to 30% by mole of $R_2O+RO$. The above described sintered vitrified superfinishing grindstone is a sintered product which includes: bonded portions 3a (see FIG. 3) formed by necking due to heating, between the particles of the powder of the borosilicate glass composition which are in contact with each other; and grain like surfaces (grain boundary surfaces) 3b.

Details including specific examples of the above described grindstone are described below.

1) Raw Materials for Abrasive Grains a) Hard Abrasive Grains

The hard abrasive grains to be used in the present invention are abrasive grains generally used today in a grindstone for superfinishing, such as common white aluminum oxide (WA), alumina abrasive grains (A), silicon carbide abrasive grains (C) and green silicon carbide (GC) abrasive grains; and super (hard) abrasive grains such as diamond (SD) abrasive grains and cubic boron nitride (CBN) abrasive grains. The abrasive grains for use in a grindstone for superfinishing have a grain diameter of 20 μm (600 mesh, JIS R6001, Abrasive Grain Sizes, Table 4: Grain Size Distribution of Microgrits (Electric Resistance Test Method)) or less. It is of course possible to select and use large particles having a particle diameter exceeding 20 μm.

b) Soft Abrasive Grains

The soft abrasive grains to be used in the present invention are abrasive grains which do not have a physical cutting ability; which chemically react with an object to be processed to improve the superfinishing performance of the resulting grindstone; and which are dispersed around the abrasive grains having a cutting ability, in the resulting grindstone. These soft abrasive grains serve to prevent the generation of microdamage on the surface of the grindstone caused by cutting chips; function as a lubricant substance layer to reduce damage caused by the bond during the discharging of the cutting chips; prevent the wear of the grindstone and the adhesion of the cutting chip to the working surface of the grindstone; and prevent the intrusion of the cutting chips into the working surface, and the melt-adhesion thereof to the working surface.

In the present invention, two kinds of grains, namely, grains of $CeO_2$ and grains of $BaSO_4$ can be selected as the soft abrasive grains. In addition, it is also possible to use grains of $SiO_2$. $ZrO_2$, etc. For example, grains of $CeO_2$ having a grain diameter of 0.5 μm and a purity of 42.5%, and grains of $BaSO_4$ having a grain diameter of 6 μm and a purity of 98% can be used. Further, in order to see if there is any difference in effect between using $BaSO_4$ and using $CeO_2$ as the soft abrasive grains, $CeO_2$ grains were used only in Example 4.

c) Mixed Abrasive Grains

In the grindstone in the present invention, the mixing ratio of the abrasive grains is generally adjusted such that the volume ratio % of the hard abrasive grains (WA, GC) is from 35 to 40%; and the volume ratio % of the soft abrasive grains ($BaSO_4$, $CeO_2$) is from 10 to 15%, with respect to the total volume of the grindstone. This is in order to prevent a decrease in the cutting performance of the resulting grindstone due to a reduced ratio of the hard abrasive grains relative to that of the soft abrasive grains, and to reduce the intrusion and adhesion of the cutting chips to the working surface of the grindstone, or to prevent the occurrence of the melt-adhesion phenomenon due to the cutting chips remaining on the surface. As described above, the grains of barium sulfate ($BaSO_4$; new Mohs hardness: from 3 to 4) or the grains of cerium oxide ($CeO_2$; new Mohs hardness: 5) can be used as the soft abrasive grains, in the present invention.

2) Binder

Figure 3:
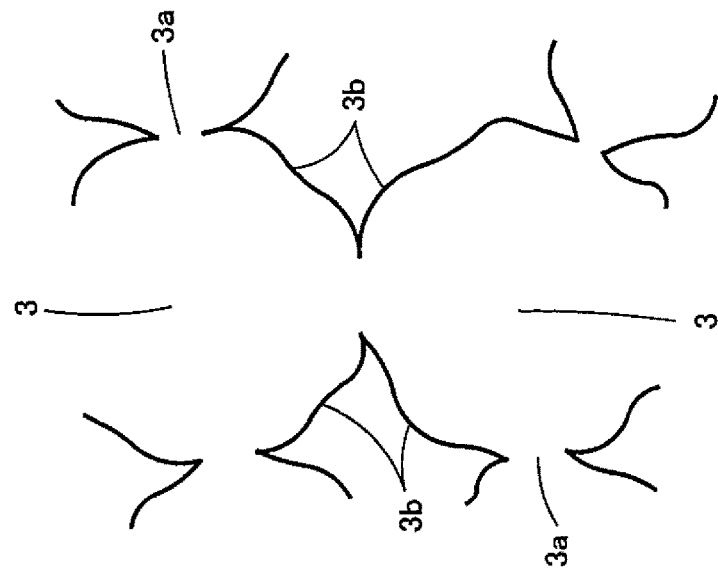
FIG. 3 is an explanatory diagram illustrating the formation of necked portions and grain boundary surfaces in the superfinishing grindstone embodying the present invention.

As shown in FIG. 3, the sintered vitrified grindstone in the present invention is a molded product obtained by heat-treating a mixed powder of the abrasive grains and the bond (sinterable vitrified binder) at a temperature equal to or lower than the melting point of the bond. By the heat treatment, the particles of the sinterable vitrified binder 3 come into contact with each other to increase the contact area; in other words, the particles of the sinterable vitrified binder 3 are bound with surrounding particles to form the necked bonded portions 3a and the grain-like surfaces (grain boundary surfaces) 3b, and thus formed into a baked solidified molded product.

Further, the heating temperature which does not cause degeneration, such as sintering, binding between grains, or reduction in weight, of the soft abrasive grains ($CeO_2$.$BaSO_4$) is less than 800° C. Therefore, the bond used in the present invention is preferably a low-melting-point bond.

In addition, in the sintering process, a preferred binder (bond) is one having a high reactivity when the particles of the bond come into contact with each other, and capable of providing a stable grain boundary contact area and binding strength.

a) Component Composition

By being subjected to heat compression at a temperature equal to or lower than the melting point of the binder (bond) so that the bond is sintered without melting, the resulting grindstone has a required hardness and strength.

The bond used in the grindstone embodying the present invention is composed of a powder of a borosilicate glass composition containing a large amount of boric acid ($B_2O_3$) and basic components (alkali metal oxide ($R_2O$) and alkaline earth metal oxide (RO)).

The ranges of the amounts (% by mole) of chemical components essential to a preferred bond in the present invention are shown in the following Table 1.

TABLE 1

| Component | % by mole |
|---|---|
| $SiO_2$ | from 35 to 55 |
| $Al_2O_3$ | from 3 to 5 |
| $B_2O_3$ | from 10 to 35 |
| $R_2O$ + RO | from 25 to 30 | b) Size of Vitrified Binder (Bond) Particles

Basically, the size of the bond particles are preferably smaller than the size of the abrasive grain (such as WA) particles. When the above described abrasive grain particles have a particle diameter of 20 μm or more, the bond particles are preferably fine powder particles having a particle diameter of less than 20 μm. This is because, if the bond particles have a particle diameter larger than the abrasive grain diameter, the abrasive grains will be present between the bond particles to interfere with the necking of the bond particles in contact with each other, and the formation of the grain boundary surfaces, resulting in a failure to obtain a stable and suitable sintering strength.

On the other hand, if the bond particles have too small a diameter, the bond particles will fill the spaces between the abrasive grain particles to cause a decrease in the porosity, thereby reducing the cutting performance. Further, a large difference between the diameter of the bond particles and that of the abrasive grain particles causes an increase in the porosity and segregation of the mixed particles.

When the grain diameter of the abrasive grains included in the grindstone for superfinishing, used in the present invention, is estimated to be from 6 to 7 μm, the bond powder preferably has a particle diameter of from 4 to 6 μm, and more preferably from 3 to 5 μm.

c) Sintering Temperature

In contrast to a conventional liquid-phase sintered vitrified grindstone, which is heated and sintered at a temperature equal to or higher than the melting point of the bond, the sintered vitrified grindstone in the present invention is heated and sintered at a temperature equal to or lower than the melting point of the bond. The melting point of the bond is in accordance with the description in JIS R3104 (Test Method for Softening Point of Glass). Alternatively, the measurement of deformation temperature may be carried out in accordance with JIS R2204 (Test Method for Refractoriness of Refractory Brick), by heating a bond molded product formed in the shape of a triangular pyramid at a temperature rise rate of 125° C./hr, so that the measured value can be taken as the melting point (° C.).

The sintering temperature is generally within the range of 90±5% of the melting point (° C.) of the bond. The sintering temperature is preferably set within the range of from 85 to 90% of the melting point, when the melting point is less than 650° C., and preferably set within the range of from 90 to 95% of the melting point, when the melting point is 650° C. or higher. When the melting point is the same, the contact between bond particles, an increase in contact area (formation of necked portions), and the disappearance of pores are accelerated at a high temperature within the range of from 90 to 95% of the melting point of the bond, and reduced at a low temperature within the range of from 85 to 90% thereof.

The sintered vitrified grindstone according to the present invention includes bonded portions formed by necking between sintered bond particles, and the grain boundary surfaces of the bond particles, and differs from a conventional liquid-phase sintered vitrified grindstone, in which the bond is allowed to melt into a liquid once and then solidified to form a bond matrix.

Accordingly, it is an important object, in the grindstone production, to produce grindstones having a uniform quality to secure the reproducibility and stability of the functions thereof. The grindstone according to the present invention has a high hardness and a high strength, preferably an RH hardness of 100 or more and a bending strength of 50 MPa or more, and thus has an excellent reproducibility, stability and reliability.

d) Releasability in Hot Compression

One of the problems associated with heat compression is adhesion between a mold and a grindstone sample. For example, a graphite mold has a poor releasability of a sample, and the use thereof causes damage in the resulting sample and the mold. The use of a commercially available mold release agent is not sufficient to prevent the damage. The mold releasability is a significant issue among the problems associated with sintering techniques. For example, it is preferred to add a high-melting-point inorganic mineral in an amount of from 0.03 to 0.06 parts by mass with respect to 1.00 parts by mass of the bond. The amount of the bond to be added is preferably from 0.04 to 0.05 parts by mass. The addition of too large an amount results in a reduced sinterability of the grindstone, whereas the addition of too small an amount results in a poor mold releasability.

The chemical composition of the high-melting-point inorganic mineral used in the present invention is, for example, as follows: $SiO_2$: from 75 to 78% by mole; $Al_2O_3$: from 11 to 13% by mole; $B_2O_3$: from 0 to 0.5% by mole, and $R_2O+RO$: from 8 to 10% by mole.

The use of the high-melting-point inorganic mineral serves to correct the effect of a reaction caused by the low-melting-point bond, which is highly basic, and thus dissolves the problem of adhesion to the graphite mold.

3) Production Process

Figure 4:
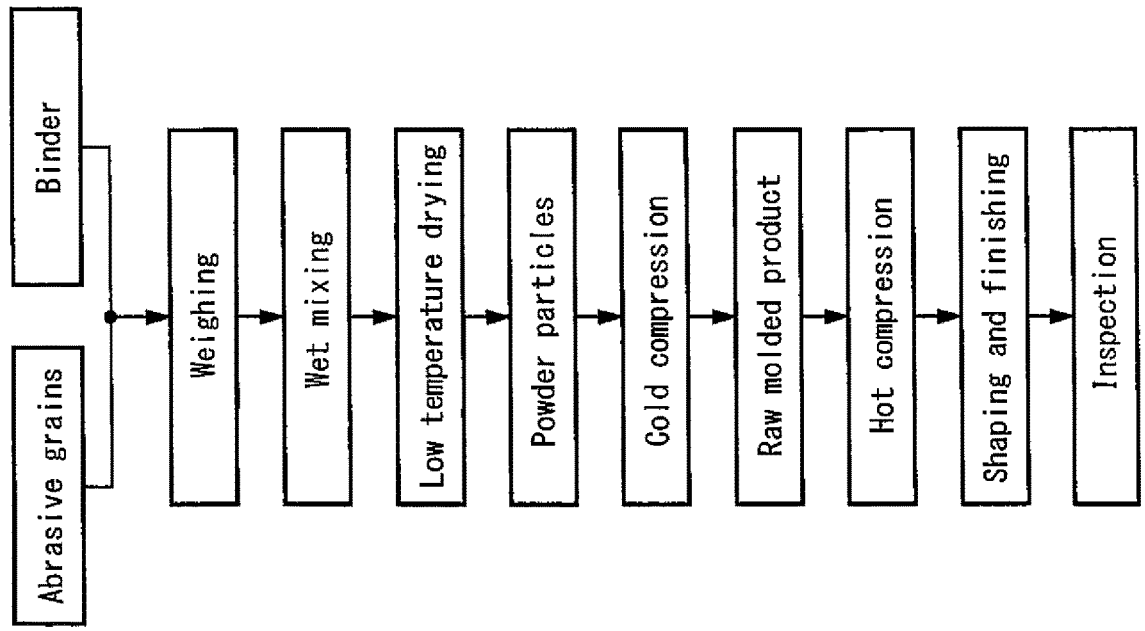
FIG. 4 is a flow chart illustrating the production process of the superfinishing grindstone.

In the production process of the sintered vitrified superfinishing grindstone embodying the present invention, as shown in FIG. 4, first, the abrasive grains and the binder are mixed by wet mixing, and the resultant is subjected to low temperature drying, to obtain a homogeneously mixed powder. Then the resultant is subjected to cold compression to be formed into a molded product once, and then subjected to hot compression to be made into a product. Further, the grindstone which has been inspected is preferably subjected to a wax treatment or the like, for example.

In the present invention, it is possible to carry out hot compression at a low temperature and a low pressure, by carrying out cold compression first. The hot compression is carried out, for example, using graphite, which is a conductor of electricity, as a mold material, and by: a sintering method using a resistive sintering furnace, which is composed of a resistive heating furnace for increasing and maintaining the temperature of the mold, integrally provided with a pressurizing mechanism; or by a high-frequency heating method.

In order to stably maintain the working surface of the grindstone clean, an organic wax may be held in the pores of the grindstone.

The organic wax is preferably a high-melting-point wax having a melting point of 85° C., and having an appropriate hardness and toughness as follows: a hardness of from 100 to 120 (as measured by a Rockwell hardness meter, at a test load of 98.1 N), a transverse rupture strength of from 10 to 20 MPa, and a bending elastic modulus of from 300 to 500 $kg/mm^2$.

The organic wax is more preferably a carnauba wax. The carnauba wax is gradually supplied through the pores, at the working points of the cutting abrasive grains, and exhibits its water repellency and lubricity, thereby serves to maintain the working surface of the grindstone clean.

Since the sintered vitrified grindstone produced by hot compression molding (hot press) has a high degree of coupling (an RH hardness of 100 or more) and a high strength (a bending strength (σb) of 50 MPa or more), it is possible to guarantee a grindstone with a stable quality and a high performance, which is capable of performing clean cutting without causing clogging of the grindstone (chipping) even in superfinishing or honing using a water-soluble oil, and thus achieving a high cutting amount with a very low abrasion loss of grindstone.

EXAMPLES

1) Production of Grindstone

The ratios of materials incorporated in the grindstones produced in Examples and Comparative Examples are shown in Tables 2 to 4. A flow chart showing the production process of the grindstones of Examples is shown in FIG. 4.

In Comparative Examples, each grindstone was produced as follows: abrasive grains, a binder, and other auxiliaries were mixed to a homogeneous state, followed by powder adjustment, molding, and drying; and then the resultant was heated and calcined at a temperature equal to or higher than the melting point of the bond, to produce a vitrified bond grindstone which had been sintered in liquid phase.

These production processes and the materials used will be described in detail.

a) Types of Grindstone

As the binder, a sintered vitrified bond was used in Examples, and a liquid-phase sintered vitrified bond was used in Comparative Examples. The component compositions of the binders used (% by mole) are shown in Table 4.

As the abrasive grains, composite abrasive grains of hard abrasive grains (white alumina: WA) or super hard abrasive grains (cubic boron nitride: CBN) and soft abrasive grains ($BaSO_4$ or $CeO_2$) were used. In one of the Comparative Examples, WA abrasive grains (single component) alone were used.

b) Abrasive Grains

As the hard abrasive grains, those having a grain diameter of from 6 to 7 μm (2,000 mesh) or from 3.5 to 4.5 μm (3,000 mesh) were used; as the super hard abrasive grains, those having a grain diameter of from 4 to 8 μm (2,500 mesh) were used; and as $BaSO_4$ grains which are the soft abrasive grains, those having a grain diameter of 6 μm, and a purity of 98% were used.

As shown in Tables 2 and 3, in each of Examples and Comparative Examples, the ratio of the amount of soft abrasive grains with respect to the total amount of abrasive grains was adjusted to a high ratio of 30% by mass or more, so as to prevent the melt-adhesion of the cutting chips to the working surface of the grindstone, or the clogging of the grindstone, in the case of using a water-soluble oil.

c) Binder

In Table 4 showing the chemical components (% by mole) of the binders (bonds), the bonds A and B are the sintered vitrified bonds used in Examples. Other bonds C, D, E, F and G are liquid-phase sintered vitrified bonds. For each of the bonds A to D, excluding E, a borosilicate glass was used as the binder, because the heating temperature (calcination temperature) of the grindstone at which the soft abrasive grains are less susceptible to thermal influence is less than 800° C., and preferably 750° C. or lower, but the binder needs to be sintered or melted at a temperature lower than the heating temperature.

The bonds A and B used in the Examples contain a large amount of boric acid ($B_2O_3$) and an alkaline component ($R_2O$), and are capable of being sintered at a low temperature. The bond E is a high-melting-point inorganic mineral made of a natural mineral as a raw material, such as feldspar, pottery stone or clay, generally selected for use in a porous grindstone with a low degree of coupling. The bond E is used in the grindstone of Comparative Example 6, which contains WA abrasive grains alone, and contains no soft abrasive grain. The bond F is a low-melting-point bond which is compatible for a calcination temperature of 730° C., and the bond G is a high-melting-point bond which is compatible for a calcination temperature of 800° C.

These binders are each incorporated in a mass (ratio of incorporated binder) shown in Tables 2 and 3, with respect to 1.0 part by mass of the total amount of the abrasive grains.

TABLE 2

| Segmentation | | Examples | | | | | | |
|---|---|---|---|---|---|---|---|---|
| | | 1 | 2 | 3 | 4 | 5 | 6 | 7 |
| Abrasive grains | Hard | WA | | | | | CBN | |
| | Soft | $BaSO_4$ | | | $CeO_2$ | | $BaSO_4$ | |
| Grain size (mesh) | Hard (WA) | 2000 | | 3000 | 2000 | | 2500 | |
| Mass ratio of abrasive grains | Hard | | | 7 | | | 5 | 4 |
| | Soft | | | 3 | | | 5 | 6 |
| Type of binder | | A | B | B | | | A | |
| Ratio of incorporated binder | | 0.45 | 0.40 | 0.40 | | | 0.5 | |

TABLE 3

| Segmentation | | Comparative Examples | | | | | | | | |
|---|---|---|---|---|---|---|---|---|---|---|
| | | 1 | 2 | 3 | 4 | 5 | 6 | 7 | 8 | 9 |
| Abrasive grains | Hard | WA | | | | | | CBN | | |
| | Soft | $BaSO_4$ | | | | | — | $BaSO_4$ | — | — |
| Grain size (mesh) | Hard (WA) | 2000 | | | | | 3000 | 2500 | | |
| Mass ratio of abrasive grains | Hard | 4 | 5 | 6 | | 7 | 10 | 6 | | 10 |
| | Soft | 6 | 5 | 4 | | 3 | 0 | 4 | | 0 |
| Type of binder | | C | | | D | | E | F | | G |
| Ratio of incorporated binder | | 0.15 | 0.20 | 0.25 | 0.40 | 0.45 | 0.22 | 0.5 | | |

TABLE 4

| Components | | Segmentation | | | | | | |
|---|---|---|---|---|---|---|---|---|
| | | A | B | C | D | E | F | G |
| $SiO_2$ | % by mole | 52.2 | 37.0 | 52.4 | 54.3 | 75.5 | 45.6 | 61.4 |
| $Al_2O_3$ | | 4.8 | 4.7 | 6.3 | 6.6 | 14.4 | 4.9 | 4.8 |
| $B_2O_3$ | | 13.3 | 32.0 | 21.5 | 19.9 | 0.2 | 25.5 | 19.4 |
| $TiO_2$ | | — | — | — | — | — | 4.1 | — |
| $R_2O$ + RO | | 29.7 | 26.3 | 19.8 | 19.2 | 9.9 | 19.9 | 14.4 | d) Sintering and Calcination

I) Hot compression: the sintering temperature is 554° C. in Examples 1, 5 to 7, and 562° C. in Examples 2 to 4. Each sample was subjected to cold compression at 50 MPa, followed by hot compression at 30 MPa. In Example 1, two sintered products (1) and (2) were prepared with the same composition, to confirm that the two products having the same composition have a little difference in performance.

II) Calcination: in Comparative Examples, each of the grindstones was prepared as described above, by mixing the components homogeneously, followed by powder adjustment, molding, drying, and sintering. In Comparative Examples 1 to 5, the grindstones were maintained at the highest temperature of 750° C. for 3 hours, and retrieved after cooling. Likewise, in Comparative Example 6, the grindstone was maintained at 1240° C. for one hour. Further, the grindstones in Comparative Examples 7 and 8 were maintained at the highest temperature of 730° C., and the grindstone in Comparative Example 9 was maintained at the highest temperature of 800° C., both for 3 hours, and retrieved after cooling.

<Observation of Sintered Structure>

Figure 7:
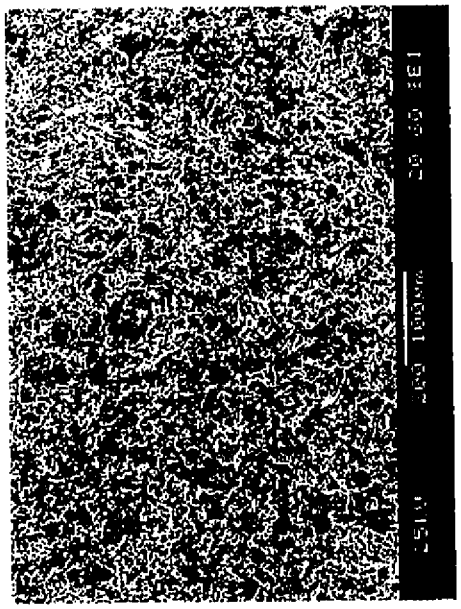
FIG. 7 (a) is a macrophotograph taken at a magnification of 200-fold.
Figure 7:
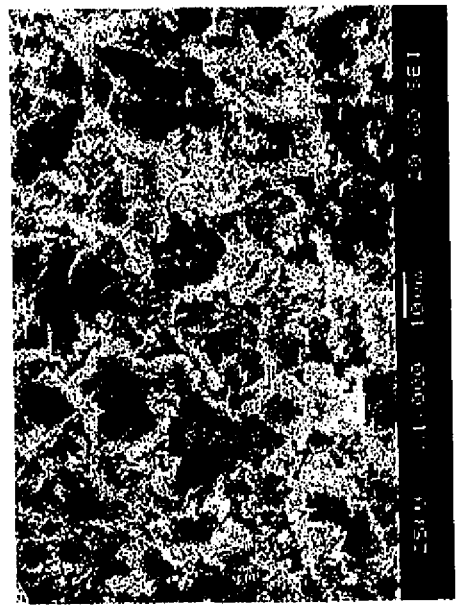
Figure 8:
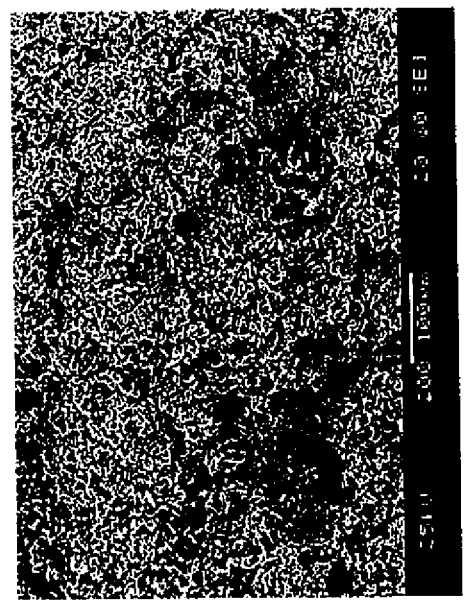
FIG. 8 (a) is a macrophotograph taken at a magnification of 200-fold.
Figure 8:
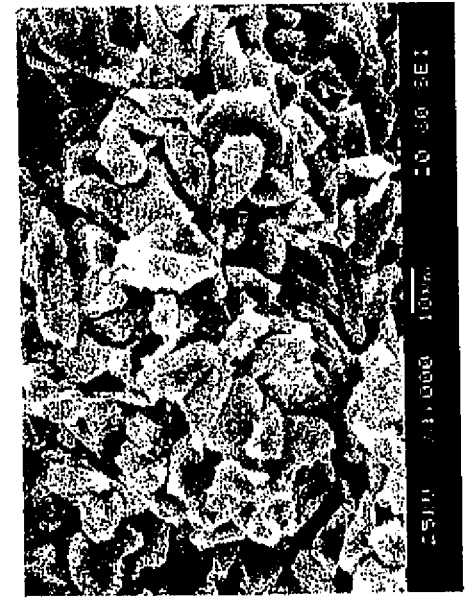

The sintered structure of the surface of the sintered vitrified superfinishing grindstone prepared in each of the Examples was observed by a scanning electron microscope. The photographs of the grindstone of Example 1 taken at specified magnifications (×200, ×1000) are shown in FIGS. 7 (a) and (b). Further, in Comparative Example 6, a liquid-phase sintered vitrified grindstone (conventional example) was prepared in the same manner as in Comparative Example 6 except for using hard abrasive grains WA having a grain size of 2000 mesh as those used in Example 1, and the structure of the surface of the grindstone was observed by a scanning electron microscope. The photographs taken at specified magnifications (×200 and ×1000) are shown in FIGS. 8 (a) and (b).

e) Grindstone Treatment

Of the samples of the grindstones prepared in Examples and Comparative Examples, those to be used in an actual cutting test using a water-soluble oil were each subjected to a filling treatment with a high-melting-point organic wax, to fill the pores of the grindstone. Note, however, that of the samples of the grindstone of the Comparative Example 6 which contains hard abrasive grains (WA) alone and no soft abrasive grains, the sample of Comparative Example 6 (2) shown in Table 7 was treated with wax, and the sample of Comparative Example 6 (1), having the same composition as the sample of 6 (2), was treated with an inorganic sulfur.

In this manner, the finishing performance of a common superfinishing grindstone which had been subjected to a general sulfur treatment was also confirmed.

2) Property Values of Grindstone

The properties of the samples of grindstones prepared in Examples and Comparative Examples, to be used in the actual cutting test, were measured for each of the following test items, and the results are shown in Tables 5 and 6.

a) Types of Property Values and Measurement Methods Thereof

I) RH hardness: the RH hardness was measured in accordance with the Rockwell test method using H scale (JIS R6240, Grinding Wheel Test Method)). When the sample was soft, the value thereof was shown as minus (−).

II) Grindstone structure: the porosity, Vp %, was measured by the water immersion method in accordance with JIS R6240-1972. Further, based on the density (g/cm$^3$) of the grindstone, the ratio of abrasive grains, Vg1+g2 %, was obtained.

As a result, the ratio of binder, Vb %, can also be obtained. Thus, the volume ratio of the hard abrasive grains, Vg1, and the volume ratio of the soft abrasive grains, Vg2, were calculated, based on the ratios of the components of the grindstone.

III) Mechanical strength of grindstone: the bending strength of grindstone was measured in accordance with JIS R1601, by 3-point bending test method.

TABLE 5

| Segmentation | | | Volume ratio % | | | | RH Hardness | Bending strength of grindstone σb MPa |
|---|---|---|---|---|---|---|---|---|
| | | | Vg$_1$ | Vg$_2$ | Vb | Vp | | |
| For actual cutting test (water-soluble oil) | Examples | 1-(1) | 36.8 | 13.9 | 37.3 | 12.0 | 124 | 105 |
| | | 1-(2) | 36.5 | 13.9 | 37.1 | 12.5 | 123 | 101 |
| | | 2 | 38.0 | 14.4 | 34.4 | 13.2 | 121 | 85 |
| | | 3 | 37.6 | 14.3 | 34.1 | 14.0 | 120 | 92 |
| | Comparative Examples | 1 | 21.4 | 28.4 | 12.7 | 37.5 | 64 | 27 |
| | | 2 | 25.4 | 22.5 | 16.1 | 36.0 | 71 | 34 |
| | | 3 | 29.9 | 17.7 | 19.7 | 32.7 | 83 | 47 |
| | | 4 | 30.7 | 11.7 | 27.8 | 29.8 | 106 | 113 |
| | | 5 | 30.2 | 11.5 | 30.7 | 27.6 | 111 | 142 |
| | | 6-(1) | 33.7 | — | 11.7 | 54.6 | −46 | 14 |
| | | 6-(2) | 38.4 | — | 13.4 | 48.5 | −35 | 16 |
| For actual cutting test (water-insoluble oil) | Examples | 1-(1) | 37.8 | 14.4 | 34.2 | 13.6 | 121 | 89 |
| | | 1-(2) | 35.6 | 13.5 | 36.1 | 14.8 | 120 | 85 |
| | | 3 | 36.8 | 13.9 | 33.2 | 16.1 | 115 | 80 |
| | | 4 | 37.2 | 10.2 | 37.9 | 14.7 | 119 | 78 |
| | Comparative Examples | 1 | 21.8 | 28.9 | 12.9 | 36.4 | 65 | 29 |
| | | 2 | 26.1 | 23.0 | 16.4 | 34.5 | 74 | 36 |
| | | 3 | 31.0 | 18.3 | 20.5 | 30.2 | 81 | 43 |
| | | 4 | 30.6 | 11.6 | 27.7 | 30.1 | 102 | 108 |
| | | 5 | 30.4 | 11.8 | 31.0 | 26.8 | 108 | 115 |
| | | 6-(1) | 35.5 | — | 12.4 | 52.1 | −41 | 14 |
| | | 6-(2) | 35.8 | — | 12.4 | 51.8 | −38 | 15 |

TABLE 6

| Segmentation | | Volume ratio % | | | | RH Hardness | Bending strength of grindstone σb MPa |
|---|---|---|---|---|---|---|---|
| | | Vg$_1$ | Vg$_2$ | Vb | Vp | | |
| Examples | 5 | 32.6 | 17.0 | 37.9 | 12.5 | 125 | 155 |
| | 6 | 27.7 | 21.6 | 38.6 | 12.1 | 126 | 176 |
| | 7 | 22.7 | 26.5 | 39.5 | 11.3 | 126 | 156 |
| Comparative Examples | 7 | 24.2 | 12.5 | 28.0 | 35.3 | 73 | 189 |
| | 8 | 33.1 | — | 25.1 | 41.8 | 55 | 171 |
| | 9 | 38.6 | — | 29.2 | 32.2 | 103 | 228 | b) Property Values

The properties of the grindstones of Examples and Comparative Examples shown in the results in Tables 5 and 6 were as follows.

I) Grindstones of Examples 1 to 7: The grindstones prepared in Examples 1 to 7 had a high hardness, with an RH hardness of 100 or more, and accordingly, the porosity Vp % was as low as less than 15%. Further, the grindstones had a high bending strength (σb MPa) of from 78 to 105. In other words, it was confirmed that the sintered vitrified grindstones of Examples' have a high hardness and high strength.

II) Grindstones of Comparative Examples: The grindstones prepared in Comparative Examples 1 to 3, which are liquid-phase sintered vitrified grindstones, had a high hardness with an RH hardness of from 64 to 83, and had a high bending strength (σb MPa) of from 27 to 47, relative to the volume ratio % of the components and the porosity of each of the sintered grindstones. Further, porous, standard selection grindstones of Comparative Examples 6 (1) and 6 (2) had a low hardness, with an RH hardness of −40±5, and a low bending strength (σb MPa) of about 15. The grindstones of Comparative Examples 4 and 5 are liquid-phase melt-vitrified grindstones, and confirmed to have a relatively high bending strength.

As can be clearly seen from the results in Table 6, the grindstone of Comparative Example 8 has a high mechanical bending strength, despite being a soft grindstone having an RH hardness of 55. The reason for this is thought to be as follows. Since the grindstones of Comparative Examples were prepared by heating at a temperature equal to or higher than the melting point of the bond to melt and liquefy the bond, followed by cooling to allow the bond to shrink and solidify between the abrasive grains, the density of the grindstones is increased as the volume thereof is decreased, resulting in an enhanced hardness and strength of the grindstones.

3) Actual Cutting Test

Figure 9:
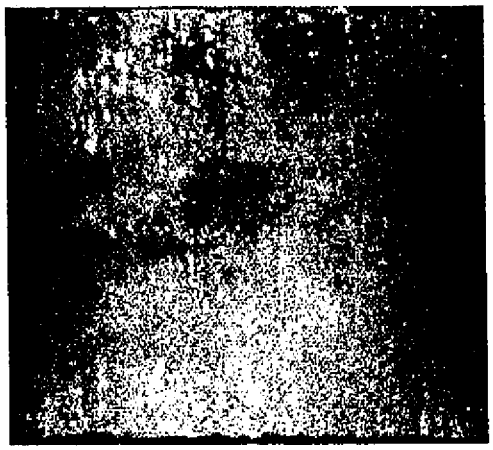
FIG. 9 (a) is a drawing substitute photograph showing the working surface of the grindstone of Example 1 after an actual cutting test using a water-soluble oil.
Figure 9:
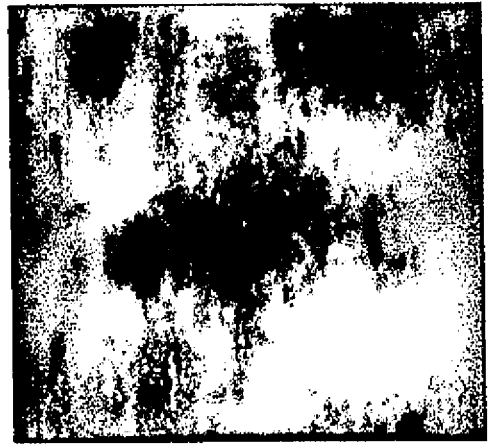

The actual cutting test of the grindstones was carried out under the following conditions, and the results thereof are shown in Tables 7 and 8. The photographs of the working surfaces of the grindstones used in the actual cutting test are shown in FIGS. 9(a) and (b) to FIGS. 19(a) and (b).

a) Conditions for Actual Cutting Test

As the actual cutting test, superfinishing of the inner race surface of a ball bearing was carried out. A pre-processing was carried out by grinding the inner race surface to a centerline average roughness of from 0.20 to 0.25 μm Ra. A test grindstone was prepared from the molded product of each of the grindstones, and finished in the shape of a square having a width of 5.5 mm, and a thickness of 5.5 μm in the circumferential direction of the product to be processed, followed by filling treatment with an organic or inorganic treatment agent, to fill the pores of the grindstone.

The surface velocity of the inner race surface of the ball bearing, which is the product to be processed, was adjusted to 5 m/s. The number of rocking of the grindstone was set to 13.3 Hz during crude processing, and set to 2.0 Hz during finishing processing; and the crude processing was carried out for 8 seconds, and the finishing processing was carried out for 2 seconds. The surface pressure of the grindstone was set to 0.3 MP when using a water-soluble oil, and set to 1.0 MPa when using water-insoluble oil. The test grindstone prepared as described above was first subjected to preconditioning processing to carry out shaping of the working surface. The first 5 pieces processed by the grindstone immediately after the shaping were excluded, and the grindstone which had subsequently processed 15 pieces in sequence was taken as the tested sample, for each of Examples and Comparative Examples.

b) Processing Oils

As the water-soluble oil, an aqueous solution or dispersion obtained by dissolving or dispersing 20% by mass in total of polyoxyethylene alkyl ether acetic acid, amine compound and nonionic surfactant, in 80% by mass of water. As the water-insoluble oil, a sulfurized fatty oil was used.

TABLE 7

| Segmentation | | | Cutting amount in diameter direction T μm | Abrasion loss of grindstone W μm | Finishing ratio T/W | Finished surface roughness Ra μm |
|---|---|---|---|---|---|---|
| Actual cutting test (water-soluble oil) | Examples | 1-(1) | 7.37 | 1.03 | 7.16 | 0.016 |
| | | 1-(2) | 6.78 | 1.10 | 6.16 | 0.017 |
| | | 2 | 6.51 | 1.03 | 6.32 | 0.016 |
| | | 3 | 6.02 | 0.96 | 6.27 | 0.015 |
| | Comparative Examples | 1 | 9.48 | 24.14 | 0.39 | 0.031 |
| | | 2 | 9.05 | 11.11 | 0.82 | 0.021 |
| | | 3 | 6.29 | 3.91 | 1.61 | 0.026 |
| | | 4 | 2.60 | 0.67 | 3.88 | 0.020 |
| | | 5 | 3.50 | 0.53 | 6.60 | 0.024 |
| | | 6-(1) | 4.25 | 1.25 | 13.62 | 0.034 |
| | | 6-(2) | 3.89 | 2.04 | 1.91 | 0.028 |
| Actual cutting test (water-insoluble oil) | Examples | 1-(1) | 6.14 | 1.00 | 6.14 | 0.015 |
| | | 1-(2) | 7.09 | 1.07 | 6.63 | 0.017 |
| | | 3 | 6.12 | 0.85 | 7.20 | 0.014 |
| | | 4 | 6.18 | 0.94 | 6.57 | 0.014 |
| | Comparative Examples | 1 | 9.61 | 12.92 | 0.74 | 0.030 |
| | | 2 | 7.74 | 10.65 | 0.73 | 0.023 |
| | | 3 | 6.07 | 2.87 | 2.21 | 0.020 |
| | | 4 | 4.15 | 0.13 | 31.92 | 0.033 |
| | | 5 | 3.30 | 0.20 | 16.50 | 0.020 |
| | | 6-(1) | 12.71 | 12.92 | 0.98 | 0.025 |
| | | 6-(2) | 10.29 | 13.86 | 0.74 | 0.022 |

TABLE 8

| Segmentation | | | Cutting amount in diameter direction T μm | Abrasion loss of grindstone W μm | Finishing ratio T/W | Finished surface roughness Ra μm |
|---|---|---|---|---|---|---|
| Actual cutting test (water-soluble oil) | Examples | 5 | 5.24 | 0.26 | 20.15 | 0.028 |
| | | 6 | 6.65 | 0.47 | 14.15 | 0.035 |
| | | 7 | 6.80 | 0.53 | 12.83 | 0.034 |
| | Comparative Examples | 7 | 5.38 | 1.62 | 3.32 | 0.058 |
| | | 8 | 10.90 | 2.60 | 4.19 | 0.057 |
| | | 9 | 10.30 | 1.48 | 6.96 | 0.062 |
| Actual cutting test (water-insoluble oil) | Examples | 5 | 7.75 | 0.07 | 110.71 | 0.038 |
| | | 6 | 7.65 | 0.07 | 109.29 | 0.033 |
| | | 7 | 8.25 | 0.12 | 68.75 | 0.036 |
| | Comparative Examples | 7 | 8.17 | 2.91 | 2.81 | 0.077 |
| | | 8 | 11.50 | 4.07 | 2.83 | 0.089 |
| | | 9 | 11.35 | 3.23 | 3.51 | 0.087 |
| | Examples | 5* | 5.25 | 0.07 | 75.00 | 0.029 |
| | | 6* | 6.00 | 0.08 | 75.00 | 0.031 |
| | | 7* | 8.20 | 0.14 | 58.57 | 0.035 |

*Without wax treatment

4) Actual Cutting Results a) Cutting Amount, and Abrasion Loss of Grindstone

In the grindstones of Examples 1 to 4, the cutting amount T (μm) was relatively high, with the values being (6 to 7)±0.5, regardless of containing the abrasive grains having a grain size of 2,000 mesh or those having a grain size of 3,000 mesh, or regardless of using the water-soluble oil or the water-insoluble oil. In contrast, the abrasion loss W (μm) of the grindstones was as low as 1.0±0.1, demonstrating an excellent finishing ratio.

The grindstones of Examples 5 to 7 exhibited a cutting amount of from 5 to 8 μm, which was sufficient for providing a smoother finished surface with a low surface roughness, without leaving pre-processing marks and/or polishing marks, and for maintaining and improving the accuracy of pre-processing.

In the grindstones of Comparative Examples 2 and 3 containing abrasive grains having a grain size of 2,000 mesh, the cutting amount (μm) was 7.9±1.6 in the case of using the water-soluble oil. However, the abrasion loss (μm) of the grindstones was 14±10, which was about 2-fold the cutting amount, demonstrating a low finishing ratio.

In the case of using the water-insoluble oil, the cutting amount (μm) of the grindstones of Comparative Examples 1, 2 and 3 was 7.8±1.7, and the abrasion loss (μm) of the grindstones was 7.9±5.0, which were roughly the same.

The grindstones of Comparative Examples 4 and 5 had a lower abrasion loss as compared to the grindstones of Examples, but had a poor cutting performance. In addition, the surfaces finished by these grindstones were not sharp enough, and rough with polishing marks.

In the grindstones of Comparative Examples 6 (1) and 6 (2), which are standard selection grindstones containing abrasive grains WA having a grain size of 3,000 mesh, the abrasion loss (μm) of the grindstone was 2 or less, but the cutting amount (μm) was also low, with the values being less than 5, in the case of using the water-soluble oil. On the other hand, in the case of using the water-insoluble oil, the grindstones of Comparative Examples 6 (1) and 6 (2) exhibited a cutting amount (μm) of 10 or more, which is similar to conventional performance results, but the abrasion loss of the grindstones was higher than the cutting amount.

As can be clearly seen from Table 8, showing the results in Examples 5 to 7 and Comparative Examples 7 to 9, the abrasion loss (μm/pc.) of the grindstones was 0.5 or less in the Examples, but it was high in Comparative Examples, with the values ranging from 1 to 4. In particular, in the grindstones of Examples 5 to 7 in the case of using the water-insoluble oil, the abrasion loss (μm/pc.) was as low as 0.1 or less, and it can be expected to greatly improve the productivity or economic efficiency, and to be able to provide a grindstone having a high economic efficiency.

In the grindstones without wax treatment, the same results as the treated grindstones were obtained. In other words, no significant difference was observed in the respective property values in the finishing performance of the grindstones, and in the conditions of the working surfaces of the grindstones, between the grindstones of Examples which had been subjected to a filling treatment with an organic wax to fill their pores and those without the treatment.

Based on the results, it is thought that the grindstones according to the present invention which contains composite abrasive grains of CBN and $BaSO_4$ and which have not been treated can also be selected for practical use, just like those which have been treated.

As described above, in both the cases of using the water-soluble oil and using the water-insoluble oil, the grindstones of Examples exhibited a cutting amount T (μm) of from 5 to 8 whereas the grindstones of Comparative Examples exhibited a higher cutting amount of from 10 to 11. However, the surfaces finished by the grindstones of Examples were free of polishing marks and smoother as compared to those finished by Comparative Examples, proving a sufficient cutting allowance (cutting amount).

The abrasion loss W (μm/pc.) in the grindstones of Examples was about 0.5 or less at the highest, in the case of using the water-soluble oil, and it was as low as about 0.1 or less, in the case of using the water-insoluble oil. The abrasion loss W (μm/pc.) in the grindstones of Comparative Examples was about 2 to 4, and it was higher in the case of using the water-insoluble oil.

As a result, the finishing ratio (T/W) was higher in Examples as compared to that in Comparative Examples, and it was confirmed that the grindstones of Examples contribute greatly to improve the productivity and economic efficiency.

b) Finished Surface Roughness

Figure 5:
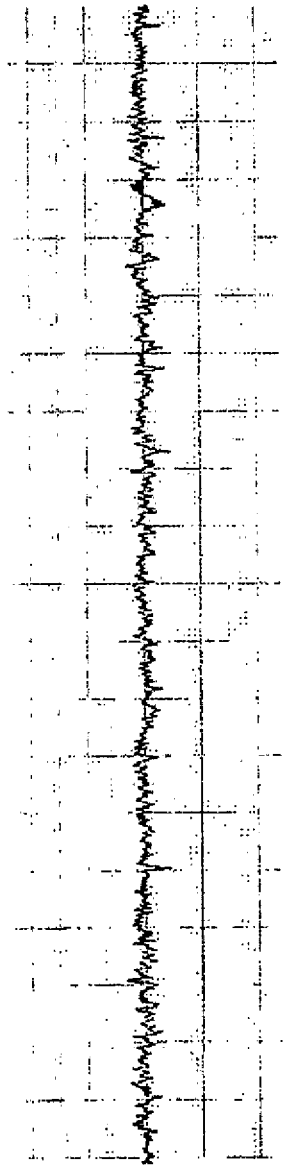
FIG. 5 (a) is a drawing substitute photograph of a measurement chart illustrating the measurement results of a surface roughness test, when superfinishing was carried out with a grindstone of Example 1 using a water-soluble oil.
Figure 6:
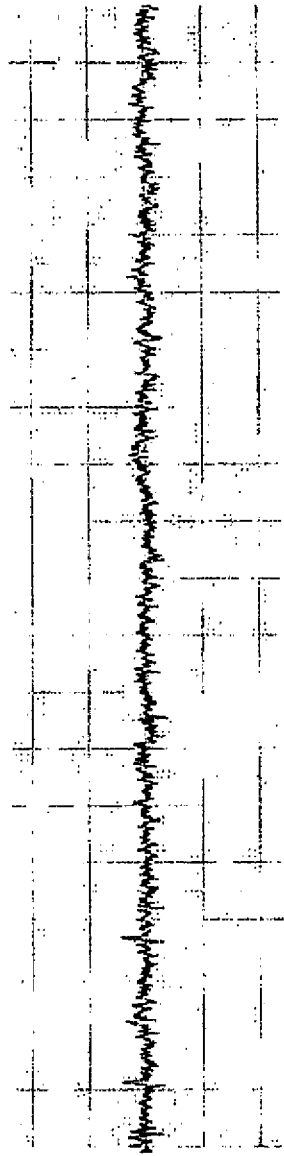
FIG. 6 (a) is a drawing substitute photograph of a measurement chart illustrating the measurement results of the surface roughness test, when superfinishing was carried out with a grindstone of Example 1 using a water-insoluble oil.

As shown in FIGS. 5(a) and (b), and FIGS. 6(a) and (b), excellent results were obtained in the actual cutting test using the grindstone of Example 1, with the finished surface roughness being less than 0.020 μm Ra in both the cases of using the water-soluble oil and using the water-insoluble oil.

In contrast, in the actual cutting test using the grindstones of Comparative Examples (drawings are omitted), the finished surfaces were rough, with the surface roughness being 0.020 µm Ra or more. In other words, it can be seen that the grindstones of Examples are capable of providing an excellent finish with a low finished surface roughness, due to including a porous microstructure provided by a specified component.

Further, as can be clearly seen from Table 8 showing the results of Examples 5 to 7 and Comparative Examples 7 to 9, in the grinding test using the water-soluble oil, the grindstones of Examples 5 to 7 exhibited a finished surface roughness (Ra µm) of 0.032 in average; whereas the grindstones of Comparative Examples 7 to 9 exhibited an Ra of 0.060 in average, providing rough surfaces.

In the grinding test using the water-insoluble oil, the grindstones of the Examples 5 to 7 exhibited an Ra of 0.036 in average, and the untreated grindstones (Examples 5*, 6* and 7*) also exhibited an Ra of 0.032 in average, showing that both the treated and untreated grindstones provided smooth finished surfaces. On the other hand, the grindstones of Comparative Examples 7 to 9 exhibited an Ra of 0.084 in average, providing rough finished surfaces. In other words, it has been confirmed that the grindstones of Examples exhibit a lower finished surface roughness as compared to the grindstones of Comparative Examples.

c) Working Surface of Grindstone

Figure 19:
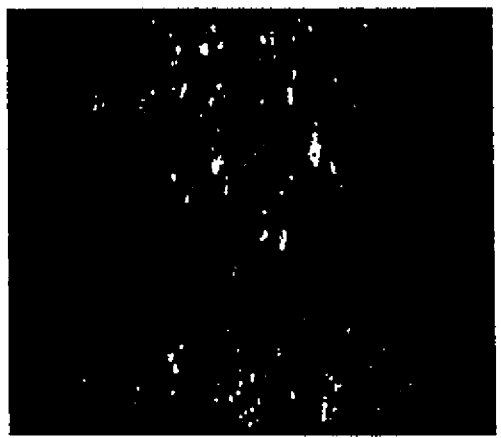
FIG. 19 (a) is a drawing substitute photograph showing the working surface of a grindstone of Comparative Example 9 after the actual cutting test using a water-soluble oil.
Figure 19:
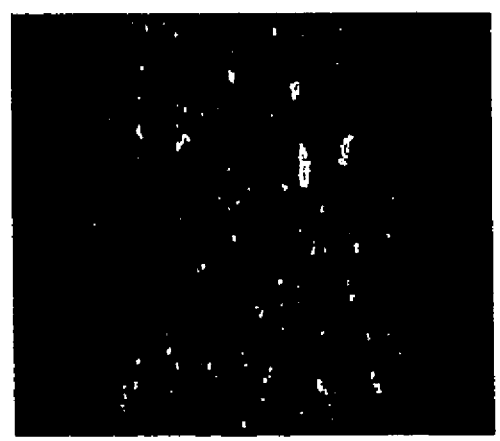

FIGS. 9(a) and (b) to FIGS. 19(a) and (b) show drawing substitute photographs of the working surfaces of the grindstones of Examples and Comparative Examples, which were used in the actual cutting test with the water-soluble oil or the water-insoluble oil.

Figure 10:
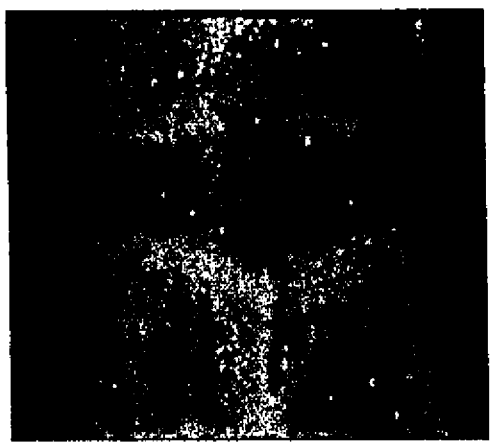
FIG. 10 (a) is a drawing substitute photograph showing the working surface of the grindstone of Example 1 after the actual cutting test using a water-insoluble oil.
Figure 10:

I) As can be clearly seen from FIGS. 9(a) and (b) and FIGS. 10(a) and (b), showing the photographs of grindstones of Examples 1, 2 and 4, the working surfaces of the grindstones were equally dark and stained blackish, but the melt-adhesion of cutting chips was not observed. In the grindstones of Examples 1, 2 and 4 used in the actual cutting test, neither the melt-adhesion of cutting chips nor an intense clogging phenomenon was observed on the working surfaces thereof, in both the cases of using the water-soluble oil (FIGS. 9(a) and (b)) and using the water-insoluble oil (FIGS. 10(a) and (b)).

Figure 11:
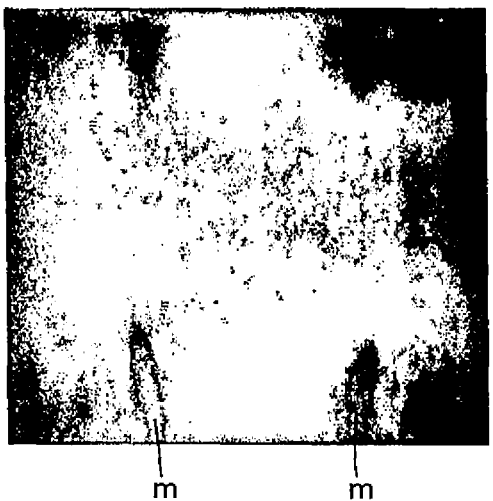
FIG. 11 (a) is a drawing substitute photograph showing the working surface of a grindstone of Comparative Example 1 after the actual cutting test using a water-soluble oil.
Figure 11:
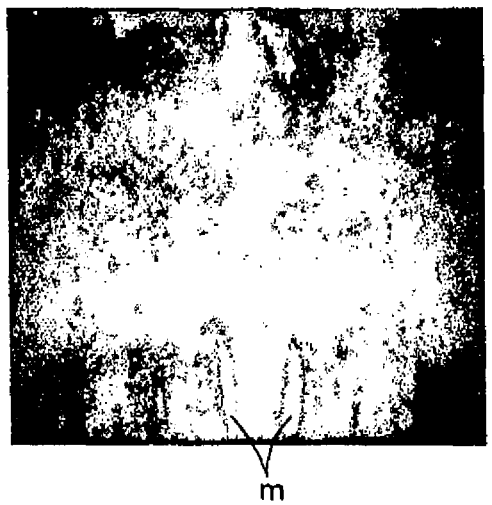
Figure 12:
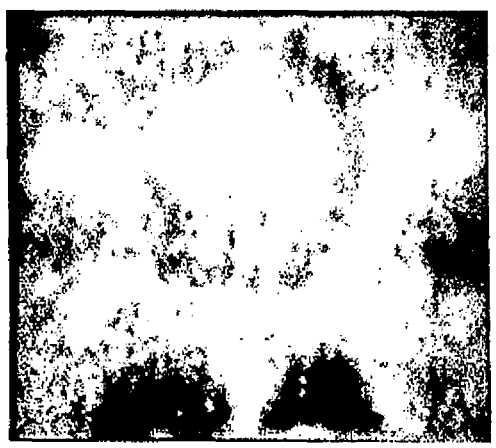
FIG. 12 (a) is a drawing substitute photograph showing the working surface of the grindstone of Comparative Example 1 after the actual cutting test using a water-insoluble oil.
Figure 12:
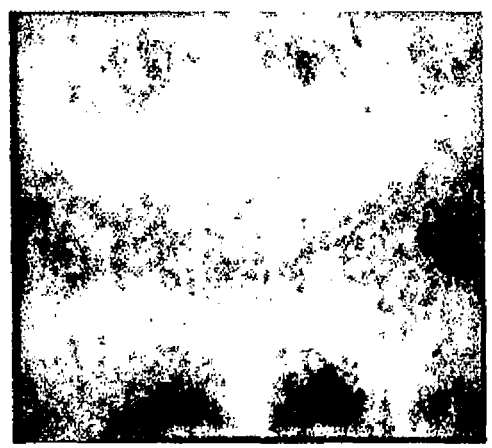

II) As can be clearly seen from FIGS. 11(a) and (b) showing the photographs of the grindstones of Comparative Examples 1 and 3, sites of melt-adhesion of cutting chips, each indicated as "m", were observed at the rear side, the flank, of the working surface, in each of the grindstones of Comparative Examples 1 and 3 in the case of using the water-soluble oil. Further, as can be clearly seen from FIGS. 12(a) and (b), no melt-adhesion phenomenon was observed in the grindstones of Comparative Examples 1 and 3, in the case of using the water-insoluble oil.

Figure 15:
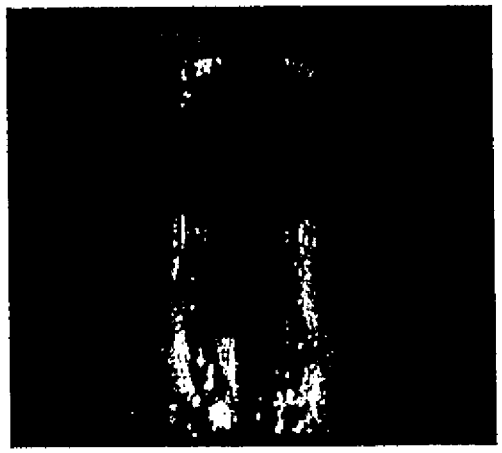
FIG. 15 (a) is a drawing substitute photograph showing the working surface of a grindstone of Comparative Example 4 after the actual cutting test using a water-soluble oil.
Figure 15:

Further, as can be clearly seen from FIGS. 15(a) and (b), intense clogging and the melt-adhesion of metal were observed in each of the grindstones of Comparative Examples 4 and 5, in the case of using the water-soluble oil.

Figure 16:
FIG. 16 (a) is a drawing substitute photograph showing the working surface of the grindstone of Comparative Example 4 after the actual cutting test using a water-insoluble oil.
Figure 16:

In addition, as can be clearly seen from FIGS. 16(a) and (b), clogging or pitching due to melt-adhesion of minute metal chips was observed in the grindstones of Comparative Example 4 and 5, even in the case of using the water-insoluble oil.

Figure 13:
FIG. 13 (a) is a drawing substitute photograph showing the working surface of a grindstone of Comparative Example 6-(1) after the actual cutting test using a water-soluble oil.
Figure 13:
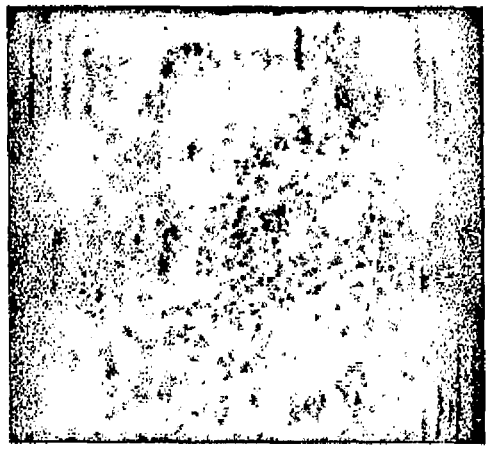
Figure 14:
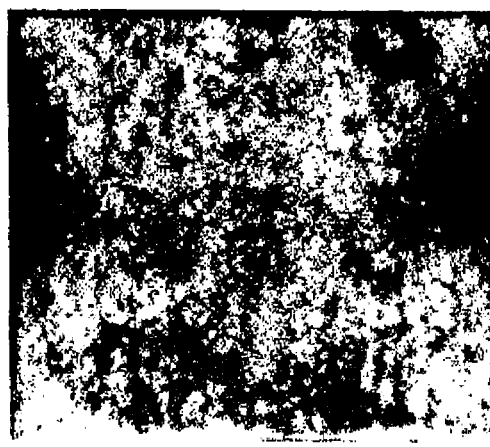
FIG. 14 (a) is a drawing substitute photograph showing the working surface of the grindstone of Comparative Example 6-(1) after the actual cutting test using a water-insoluble oil.
Figure 14:
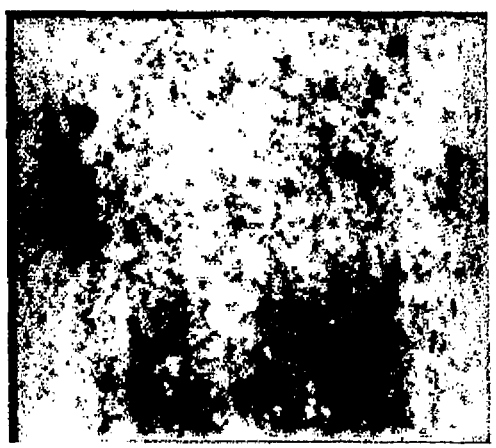

III) As can be clearly seen from FIGS. 13(a) and (b) and FIGS. 14(a) and (b) showing the photographs of the grindstones of Comparative Example 6 (3,000 mesh), no apparent melt-adhesion phenomenon was observed in the standard selection grindstones, namely, in the grindstones of Comparative Examples 6 (1) and 6 (2) (FIGS. 13(a) and (b)) in the case of using the water-soluble oil, and in the grindstones of Comparative Examples 6 (1) and 6 (2) (FIGS. 14(a) and (b)) in the case of using the water-insoluble oil.

Further, the results of the actual cutting test (photographs of working surfaces of grindstones) of the grindstones of Examples and Comparative Examples containing super hard abrasive grains CBN are shown in FIGS. 17(a) to (c) to FIGS. 19(a) and (b).

Figure 18:
FIG. 18 (a) is a drawing substitute photograph showing the working surface of a grindstone of Comparative Example 8 after the actual cutting test using a water-soluble oil.
Figure 18:

The results of the actual cutting test (photographs of working surfaces of grindstones) of the grindstones of Example 5, Comparative Example 8, and Comparative Example 9, in the case of using the water-soluble oil, are shown in FIG. 17(a), FIG. 18(a), and FIG. 19(a), respectively. Further, the results of the actual cutting test (photographs of working surfaces of grindstones) of the grindstones of Example 6, Comparative Example 8, and Comparative Example 9, in the case of using the water-insoluble oil, are shown in FIGS. 17(b) and (c), FIG. 18(b), and FIG. 19(b), respectively.

In the grindstones of Examples 5 and 6 containing composite abrasive grains of super hard abrasive grains CBN and soft abrasive grains $BaSO_4$, although difference in shade or the light-reflected portions in the photographs due to cutting was/were observed on the working surfaces of the grindstones, no melt-adhesion of cutting chips was observed. Further, in the grindstones of Comparative Examples 8 and 9 containing CBN abrasive grains alone, whose photographs are shown in FIGS. 18(a) and (b), and FIGS. 19(a) and (b), respectively, the intrusion and retention, and the melt-adhesion, of minute cutting chips into or on the working surfaces of the grindstones were observed. In addition, in the grindstone of Comparative Example 7 containing composite abrasive grains of hard abrasive grains CBN and soft abrasive grains $BaSO_4$, no apparent melt-adhesion of cutting chips was observed on the working surface of the grindstone.

As described regarding Table 7, each of the grindstones of Examples 1 to 4 exhibited a high cutting amount of 6 µm or more, with a very low abrasion loss of grindstone of about 1 µm, in both the cases of using the water-soluble oil and using the water-insoluble oil. Thus, the grindstones of Examples achieved a high finishing ratio (cutting amount/abrasion loss of grindstone), and were proven to be grindstones having a high economic efficiency.

On the other hand, the grindstones of Comparative Examples 1 to 6 exhibited a high abrasion loss, and a low finishing ratio although it varies depending on the cutting amount, and were proven to have a poor cutting efficiency.

Further, the grindstones of Examples 1 to 4 exhibited a low finished surface roughness Ra of less than 0.02 µm, but the grindstones of Comparative Examples 1 to 6 exhibited a high Ra of 0.02 µm or more.

As described above, it has been confirmed that the sintered vitrified grindstones of Examples are high performance grindstones hitherto not available, which are capable of exhibiting a good cutting performance with a very low abrasion loss of grindstone, and of providing a smooth finished surface with a low surface roughness, and that the present invention provides significant effects.

On the other hand, the vitrified grindstones of Comparative Examples, which have the same composition as the grindstones of Examples but were prepared by being sintered in liquid phase, exhibited a lower cutting amount as compared to the grindstones of Examples, despite having a high mechanical bending strength. In addition, the surfaces finished by these vitrified grindstones were rough with polishing marks, and the working surfaces of the grindstones were intensely clogged, proving a poor practicality.

The reason why the grindstones of Comparative Examples have a higher mechanical strength (σb MPa) as compared to the grindstones of Examples is due to the difference whether the bond went through a molten state or not; in other words, it is because, the grindstones of Examples contain a solid-phase sintered vitrified bond, which has been sintered in solid phase without melting, whereas the grindstones of Comparative Examples contain a liquid-phase melt-vitrified bond, which has been melted and sintered in liquid phase.

Further, the grindstones of Examples have an RH hardness of 120 or more, a bending strength (σb MPa) of 50 or more, and a low porosity (%) of 15 or less, which are also the characteristics of the present invention.

The surfaces finished by the grindstones of Examples are smooth with a low surface roughness Ra (μm) of less than 0.04, in both the cases of using the water-soluble oil and using the water-insoluble oil. The surfaces finished by the grindstones of Comparative Examples are smooth with a surface roughness of 0.060, in the case of using the water-soluble oil, but rough in the case of using water-insoluble oil, with a high surface roughness of 0.084.

DESCRIPTION OF SYMBOLS 1 hard abrasive grains
2 soft abrasive grains
3 sinterable vitrified binder
3a bonded portion
3b grain-like surface
4 pore
5 bond belt
m site of melt-adhesion

The invention claimed is:

1. A sintered vitrified superfinishing grindstone,
   wherein the sintered vitrified superfinishing grindstone is a sintered product which is obtained by compression molding of a mixed powder of: a vitrified binder composed of a powder of a borosilicate glass composition; and abrasive grains; and which includes bonded portions formed by necking due to heating, between particles of the powder of the borosilicate glass composition which are in contact with each other;
   wherein the vitrified binder is a sinterable vitrified binder which contains from 94 to 100% by mass of a powder composed of a low-melting-point borosilicate glass composition containing from 35 to 55% by mole of $SiO_2$; from 3 to 5% by mole of $Al_2O_3$; from 10 to 35% by mole of $B_2O_3$; and from 25 to 30% by mole of $R_2O+RO$; and
   wherein an inorganic mold release agent having a melting point which is higher than a melting point of the low-melting-point borosilicate glass composition is added to the sinterable vitrified binder.

2. The sintered vitrified superfinishing grindstone according to claim 1, wherein the sintered product has a porosity of from 8 to 20% by volume.

3. The sintered vitrified superfinishing grindstone according to claim 1, wherein the sintered vitrified superfinishing grindstone has an RH hardness of 100 or more, and has a bending strength of from 50 MPa or more.

4. The sintered vitrified superfinishing grindstone according to claim 1, wherein the abrasive grains are composite abrasive grains obtained by mixing: one or more kinds of hard abrasive grains selected from white alumina matter, green silicon carbide matter, cubic boron nitride and diamond; and one or more kinds of soft abrasive grains selected from cerium oxide, barium sulfate, silicon oxide, zirconium oxide and calcium carbonate.

5. The sintered vitrified superfinishing grindstone according to claim 1, wherein the sintered product is a sintered product obtained by resistive sintering, or a sintered product obtained by induction heating.

6. The sintered vitrified superfinishing grindstone according to claim 1, wherein the sintered vitrified superfinishing grindstone is used in superfinishing or honing in which a water-soluble cutting oil is used.

7. The sintered vitrified superfinishing grindstone according to claim 2, wherein the sintered vitrified superfinishing grindstone has an RH hardness of 100 or more, and has a bending strength of from 50 MPa or more.

8. The sintered vitrified superfinishing grindstone according to claim 2, wherein the abrasive grains are composite abrasive grains obtained by mixing: one or more kinds of hard abrasive grains selected from white alumina matter, green silicon carbide matter, cubic boron nitride and diamond; and one or more kinds of soft abrasive grains selected from cerium oxide, barium sulfate, silicon oxide, zirconium oxide and calcium carbonate.

9. The sintered vitrified superfinishing grindstone according to claim 3, wherein the abrasive grains are composite abrasive grains obtained by mixing: one or more kinds of hard abrasive grains selected from white alumina matter, green silicon carbide matter, cubic boron nitride and diamond; and one or more kinds of soft abrasive grains selected from cerium oxide, barium sulfate, silicon oxide, zirconium oxide and calcium carbonate.

10. The sintered vitrified superfinishing grindstone according to claim 7, wherein the abrasive grains are composite abrasive grains obtained by mixing: one or more kinds of hard abrasive grains selected from white alumina matter, green silicon carbide matter, cubic boron nitride and diamond; and one or more kinds of soft abrasive grains selected from cerium oxide, barium sulfate, silicon oxide, zirconium oxide and calcium carbonate.

11. The sintered vitrified superfinishing grindstone according to claim 2, wherein the sintered product is a sintered product obtained by resistive sintering, or a sintered product obtained by induction heating.

12. The sintered vitrified superfinishing grindstone according to claim 4, wherein the sintered product is a sintered product obtained by resistive sintering, or a sintered product obtained by induction heating.

13. The sintered vitrified superfinishing grindstone according to claim 10, wherein the sintered product is a sintered product obtained by resistive sintering, or a sintered product obtained by induction heating.

14. The sintered vitrified superfinishing grindstone according to claim 7, wherein the sintered vitrified superfinishing grindstone is used in superfinishing or honing in which a water-soluble cutting oil is used.

15. The sintered vitrified superfinishing grindstone according to claim 10, wherein the sintered vitrified superfinishing grindstone is used in superfinishing or honing in which a water-soluble cutting oil is used.

* * * * *